(12) United States Patent
Kim et al.

(10) Patent No.: US 7,350,365 B2
(45) Date of Patent: Apr. 1, 2008

(54) METHOD FOR CONTROLLING COGENERATION SYSTEM

(75) Inventors: Cheol Min Kim, Seoul (KR); Cheol Soo Ko, Kyungki-do (KR); Sim Bok Ha, Kyungki-do (KR); Baik Young Chung, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 11/250,395

(22) Filed: Oct. 17, 2005

(65) Prior Publication Data

US 2006/0123818 A1 Jun. 15, 2006

(30) Foreign Application Priority Data

Dec. 14, 2004 (KR) ............... 10-2004-0105545

(51) Int. Cl.
*F25B 27/00* (2006.01)
(52) U.S. Cl. ............... 62/115; 62/230; 62/236; 62/323.3
(58) Field of Classification Search ................. 62/115, 62/323.1, 228.1, 236, 323.3, 230
See application file for complete search history.

(56) References Cited

U.S. PATENT DOCUMENTS

| | | | | |
|---|---|---|---|---|
| 4,226,090 A | * | 10/1980 | Horian | 62/133 |
| 4,271,677 A | * | 6/1981 | Harr | 62/127 |
| 4,715,192 A | * | 12/1987 | Katz | 62/323.1 |
| 4,819,444 A | * | 4/1989 | Meckler | 62/238.6 |
| 4,910,969 A | * | 3/1990 | Dalin et al. | 62/238.6 |
| 5,265,435 A | * | 11/1993 | Richardson | 62/133 |
| 6,874,330 B2 | * | 4/2005 | Iritani | 62/236 |
| 2005/0044873 A1 | * | 3/2005 | Tamai et al. | 62/323.1 |
| 2005/0132736 A1 | * | 6/2005 | Grimm et al. | 62/230 |

FOREIGN PATENT DOCUMENTS

| | | |
|---|---|---|
| JP | 2004-125258 A | 4/2004 |
| KR | 10-2004-0042089 A | 5/2004 |

* cited by examiner

*Primary Examiner*—William E. Tapolcai
(74) *Attorney, Agent, or Firm*—Birch, Stewart, Kolasch & Birch, LLP (57) ABSTRACT

A method for controlling a cogeneration system is disclosed. The control method determines whether or not the operation load or power load of an air conditioner corresponds to a load requiring driving of a generator, controls the generator to operate when it is determined that the operation load of the air conditioner corresponds to the generator driving load, controls the air conditioner to operate using electric power generated from the generator when the generator operates normally, and controls the air conditioner to operate using commercial electric power when the operation load of the air conditioner is not the generator driving load or when the generator operates abnormally. Accordingly, there are advantages in terms of economy and safety.

20 Claims, 8 Drawing Sheets

METHOD FOR CONTROLLING COGENERATION SYSTEM

BACKGROUND OF THE INVENTION

1. Field of the Invention

The present invention relates to a method for controlling a cogeneration system, and, more particularly, to a method for controlling a cogeneration system, wherein whether or not a generator included in the cogeneration system is to be driven is determined in accordance with the operation load of an air conditioner included in the cogeneration system.

2. Description of the Related Art

Figure 1:
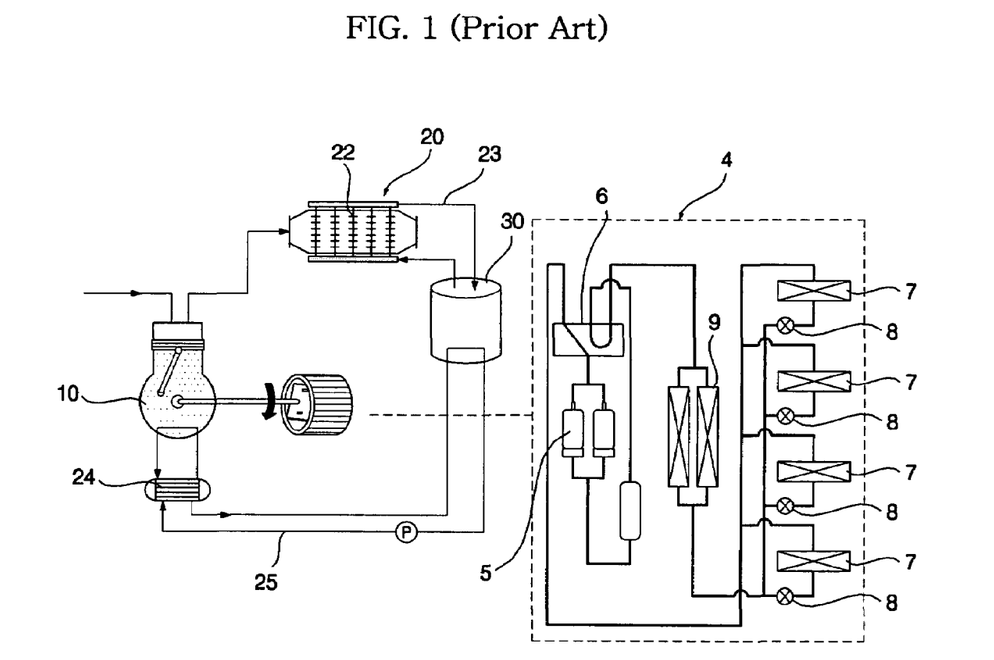
FIG. 1 is a schematic view illustrating a conventional cogeneration system.

FIG. 1 is a schematic view illustrating a conventional cogeneration system.

As shown in FIG. 1, the conventional cogeneration system includes a generator 2 to generate electric power, a drive source 10, which operates to drive the generator 2, and generates waste heat during the operation thereof, such as an engine (hereinafter, the drive source 10 will be referred to as an "engine"), a waste heat recoverer 20 to recover waste heat generated from the engine 10, and a heat consumer 30 to utilize the waste heat recovered by the waste heat recoverer 20, such as a thermal storage tank.

The electric power generated from the generator 2 is supplied to various electric home appliances including the air conditioner 4 and various home illumination devices. To this end, the generator 2 is connected with the electric home appliances via power lines 3.

The air conditioner 4 includes compressors 5, a 4-way valve 6, indoor heat exchangers 7, expansion devices 8, and outdoor heat exchangers 9.

When the air conditioner operates in a cooling mode, each compressor 5 compresses a refrigerant introduced thereinto. The compressed refrigerant passes through the 4-way valve 6, outdoor heat exchangers 9, expansion devices 8, indoor heat exchangers 7, and 4-way valve 6, in this order, and returns to the compressors 5. In this case, each outdoor heat exchanger 9 functions as a condenser, and each indoor heat exchanger 7 functions as an evaporator to absorb heat from indoor air.

On the other hand, when the air conditioner operates in a heating mode, the refrigerant compressed in each compressor 5 passes through the 4-way valve 6, indoor heat exchangers 7, expansion devices 8, outdoor heat exchangers 9, and 4-way valve 6, in this order, and returns to the compressors 9. In this case, each outdoor heat exchanger 9 functions as an evaporator, and each indoor heat exchanger 7 functions as a condenser to heat indoor air.

The waste heat recoverer 20 includes an exhaust gas heat exchanger 22 to absorb heat from exhaust gas discharged from the engine 10, and a cooling water heat exchanger 24 to absorb heat from cooling water used to cool the engine 10.

The exhaust gas heat exchanger 22 is connected with the heat consumer 30 via a first heat supply line 23. Accordingly, the exhaust gas heat exchanger 22 can transfer the waste heat absorbed from the exhaust gas of the engine 10 to the heat consumer 30 via the first heat supply line 23. As mentioned above, the heat consumer 30 may be a thermal storage tank.

The cooling water heat exchanger 24 is connected with the heat consumer 30 via a second heat supply line 24. Accordingly, the cooling water heat exchanger 24 can transfer the waste heat absorbed from the cooling water of the engine 10 to the heat consumer 30 via the second heat supply line 24.

In the conventional cogeneration system, however, the engine 10 is driven irrespective of the load of the electric home appliances including the air conditioner 4 and various illumination appliances. For this reason, there is a problem in that the conventional cogeneration system is uneconomical when the load of the electric home appliances is low.

Furthermore, the conventional cogeneration system has a problem in that the waste heat of the engine 10 is utilized only in the heat consumer 30, which may be a thermal storage tank, without being utilized in the air conditioner 4, so that the efficiency of the cogeneration system cannot be maximized.

SUMMARY OF THE INVENTION

The present invention has been made in view of the above-mentioned problems, and it is an object of the invention to provide a method for controlling a cogeneration system, wherein an air conditioner included in the cogeneration system is driven using commercial electric power when the power load of the air conditioner is small, and is driven using electric power generated in the cogeneration system when the power load of the air conditioner is large, so that the cogeneration system is highly economical.

Another object of the invention is to provide a method for controlling a cogeneration system, wherein the refrigerant in an air conditioner included in the cogeneration system is evaporated using waste heat of a drive source included in the cogeneration system during a heating operation of the air conditioner, so that it is possible to provide a constant heating capacity irrespective of outdoor temperature.

In accordance with one aspect, the present invention provides a method for controlling a cogeneration system, comprising: a first step of receiving an operation ON signal for an air conditioner; a second step of, following the first step, determining whether or not a power load of the air conditioner corresponds to a generator driving load requiring driving of a generator; a third step of, if it is determined at the second step that the power load corresponds to the generator driving load, rotating a radiating fan, switching a flow rate control valve to a radiating mode, driving a heat medium circulation pump, and driving a drive source adapted to drive the generator; a fourth step of, following the third step, checking an electric power generation state of the generator; a fifth step of, if it is determined at the fourth step that the generator operates normally, switching electric power supplied to the air conditioner from commercial electric power to electric power generated from the generator; and sixth step of, following the fifth step, operating the air conditioner.

The checking of the electric power generation state of the generator at the fourth step may be executed when a predetermined time elapses after the drive source begun to operate.

When the air conditioner is a heat pump type air conditioner, and the operation ON signal is an ON signal for a heating operation of the heat pump type air conditioner, the sixth step may comprise switching the flow rate control valve to a waste heat recovering mode to allow waste heat of the drive source to be recovered by a waste heat supplying heat exchanger, and stopping the radiating fan.

When the air conditioner is a heat pump type air conditioner, and the operation ON signal is an ON signal for a heating operation of the heat pump type air conditioner, the sixth step may comprise operating the heat pump type air conditioner in a heating mode, determining whether or not it is necessary to recover waste heat of the drive source by a waste heat supplying heat exchanger, following the operation of the heat pump type air conditioner, and switching the flow rate control valve to a waste heat recovering mode to allow the waste heat of the drive source to be recovered by the waste heat supplying heat exchanger when it is determined that it is necessary to recover the waste heat.

The sixth step may further comprise fixing an opening degree of the flow rate control valve to an initial opening degree when the flow rate control valve is switched to the waste heat recovering mode, and subsequently executing a flow rate control process at intervals of a predetermined time. The flow rate control process for the flow rate control valve may comprise a primary opening degree variation value calculation procedure for calculating a primary opening degree variation value, based on a current discharge pressure difference of compressors included in the heat pump type air conditioner from a target discharge pressure, a secondary opening degree variation value calculation procedure for calculating a secondary opening degree variation value, based on a current suction overheat degree difference of the compressors in the heat pump type air conditioner from a target suction overheat degree, and an opening degree variation procedure for varying the opening degree of the flow rate control valve, based on a final opening degree variation value obtained by adding the secondary opening degree variation value to the primary opening degree variation value.

When the cogeneration system comprises an outdoor heat exchanger bypass conduit adapted to guide a refrigerant emerging from an expansion device included in the heat pump type air conditioner in an expanded state to bypass an outdoor heat exchanger included in the heat pump type air conditioner, waste heat supplying heat exchanger connecting conduits adapted to guide the refrigerant bypassed through the outdoor heat exchanger bypass conduit during the heating operation of the heat pump type air conditioner to enter a-way valve after passing through the waste heat supplying heat exchanger, a waste heat supplying heat exchanger bypass conduit to guide the refrigerant emerging from the-way valve during a cooling operation of the heat pump type air conditioner to bypass the waste heat supplying heat exchanger; a first bypass valve arranged at the outdoor heat exchanger bypass conduit, second and third bypass valves arranged at the waste heat supplying heat exchanger connecting conduits; a first cooling operation control valve arranged between an inlet) of the outdoor heat exchanger bypass conduit and the outdoor heat exchanger, and a second cooling operation control valve arranged at the waste heat supplying heat exchanger bypass conduit, the sixth step may comprise a first procedure for opening the first, second and third bypass valves while closing the second cooling operation control valve to cause the refrigerant in the heat pump type air conditioner to be evaporated by the waste heat supplying heat exchanger after bypassing the outdoor heat exchanger, a second procedure for closing the first cooling operation control valve when a predetermined time elapses after the second cooling operation control valve is closed, and a third procedure for stopping an outdoor fan when a predetermined time elapses after the first cooling operation control valve is closed.

The sixth step may further comprise a fourth procedure for determining whether or not it is necessary to stop the recovery of waste heat, following the stopping of the outdoor fan, and a fifth procedure for, if it is determined in the fourth procedure that it is necessary to stop the recovery of waste heat, rotating the outdoor fan, closing the first, second, and third bypass valves 4, opening the first and second cooling operation control valves, and switching the flow rate control valve to the radiating mode.

The sixth step may further comprise a sixth procedure for again determining whether or not it is necessary to execute the recovery of waste heat, when a predetermined time elapses after execution of the fifth step, and a seventh procedure for repeating the procedures, starting from the first procedure, when it is determined in the sixth procedure that it is necessary to execute the recovery of waste heat.

The control method may further comprise a seventh step of, if it is determined at the sixth step that it is unnecessary to recover the waste heat, determining whether or not the power load of the heat pump type air conditioner corresponds to a generator stopping load not requiring the driving of the generator, and an eighth step of, if it is determined at the seventh step that the power load of the heat pump type air conditioner corresponds to the generator stopping load, switching the electric power supplied to the heat pump type air conditioner from the generated electric power to the commercial electric power, and operating the heat pump type air conditioner in the heating mode using the generated electric power.

The control method may further comprise stopping the drive source when a predetermined time elapses after the switching of the electric power from the generated electric power to the commercial electric power at the eighth step.

The control method may further comprise stopping the radiating fan and the heat medium circulation pump when a predetermined time elapses after the stopping of the drive source.

The control method may further comprise repeating the steps, starting from the second step, after the stopping of the radiating fan and the heat medium circulation pump.

The control method may further comprise switching the electric power supplied to the heat pump type air conditioner from the generated electric power to the commercial electric power, and stopping the drive source when it is determined at the seventh step that the power load of the heat pump type air conditioner does not correspond to the generator stopping load, a heating operating OFF signal for the heat pump type air conditioner is inputted, and an operation ON signal is not inputted within a predetermined time after the heating operation OFF signal was input.

The control method may further comprise stopping the radiating fan and the heat medium circulation pump when a predetermined time elapses after the stopping of the drive source.

In accordance with another aspect, the present invention provides a method for controlling a cogeneration system, comprising: a first step of receiving a cooling operation ON signal for an air conditioner; a second step of, following the first step, switching a refrigerant path established in the air conditioner to allow a refrigerant in the air conditioner to be circulated through a compressor, an outdoor heat exchanger, an expansion device, and an indoor heat exchanger, and switching a flow rate control valve to a radiating mode; a third step of driving a heat medium circulation pump, rotating a radiating fan, and driving a drive source adapted to drive the generator; a fourth step of, following the third step, checking an electric power generation state of the generator; a fifth step of, if it is determined at the fourth step that the generator operates normally, switching electric power supplied to the air conditioner from commercial electric power to electric power generated from the generator; and a sixth step of, following the fifth step, operating the air conditioner in a cooling mode.

When the cogeneration system comprises an outdoor heat exchanger bypass conduit adapted to guide a refrigerant emerging from expansion devices, included in the air conditioner in an expanded state to bypass an outdoor heat exchanger included in the air conditioner, waste heat supplying heat exchanger connecting conduits adapted to guide the refrigerant bypassed through the outdoor heat exchanger bypass conduit during the heating operation of the air conditioner to enter a-way valve after passing through the waste heat supplying heat exchanger, a waste heat supplying heat exchanger bypass conduit to guide the refrigerant emerging from the-way valve during a cooling operation of the air conditioner to bypass the waste heat supplying heat exchanger, a first bypass valve arranged at the outdoor heat exchanger bypass conduit, second and third bypass valves arranged at the waste heat supplying heat exchanger connecting conduits, a first cooling operation control valve arranged between an inlet of the outdoor heat exchanger bypass conduit and the outdoor heat exchanger, and a second cooling operation control valve arranged at the waste heat supplying heat exchanger bypass conduit, the second step may comprise closing the first, second and third bypass valves while opening the first and second cooling operation control valves.

The control method may further comprise switching the electric power supplied to the air conditioner from the generated electric power to the commercial electric power, and stopping the drive source when a cooing operating OFF signal for the air conditioner is inputted during execution of the sixth step, and a cooling operation ON signal is not inputted within a predetermined time after the cooling operation OFF signal was input.

The control method may further comprise stopping the radiating fan and the heat medium circulation pump when a predetermined time elapses after the stopping of the drive source.

The control method may further comprise rotating a ventilation fan during the rotation of the radiating fan, and stopping the ventilation fan when the ventilation fan is stopped.

The cogeneration system control method according to the present invention has advantages in terms of economy and safety because the control method determines whether or not the operation load or power load of the air conditioner corresponds to the generator driving load, controls the generator to operate when it is determined that the operation load of the air conditioner corresponds to the generator driving load, controls the air conditioner to operate using electric power generated from the generator when the generator operates normally, and controls the air conditioner to operate using commercial electric power when the operation load of the air conditioner is not the generator driving load or when the generator operates abnormally.

The cogeneration system control method according to the present invention also has an advantage in that it is possible to provide a constant heating capacity irrespective of outdoor temperature because the refrigerant of the air conditioner is evaporated using the waste heat generated from the drive source during an operation of the drive source to drive the generator when the air conditioner operates in the heating mode.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings. In the following description, identical elements are referred to by the same title and designated by the same reference numeral, without any redundant description thereof.

Figure 2:
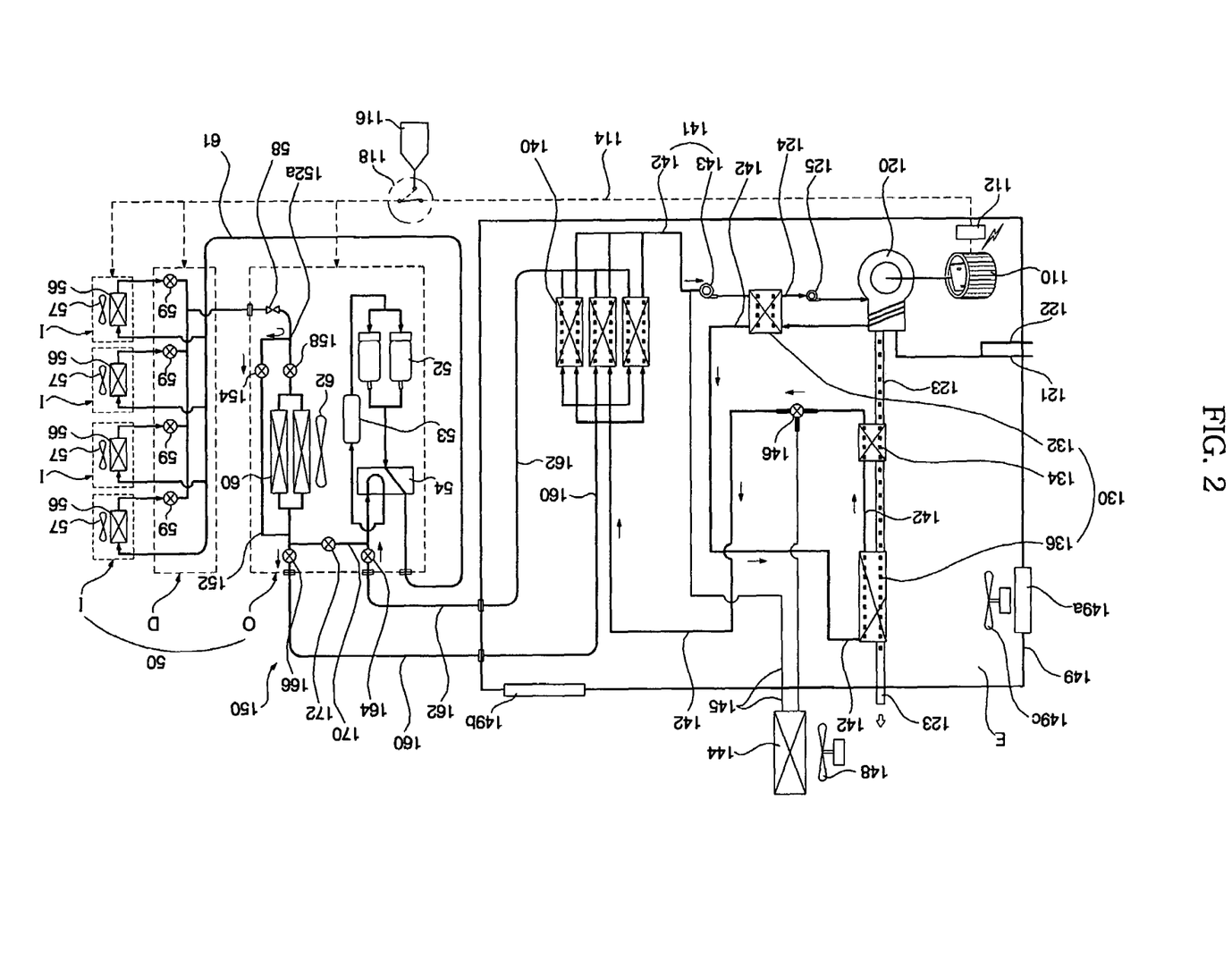
FIG. 2 is a schematic diagram of a cogeneration system, to which a control method according to an exemplary of the present invention is applied, illustrating a state in which the cogeneration system operates in a waste heat recovering and heating mode.
Figure 3:
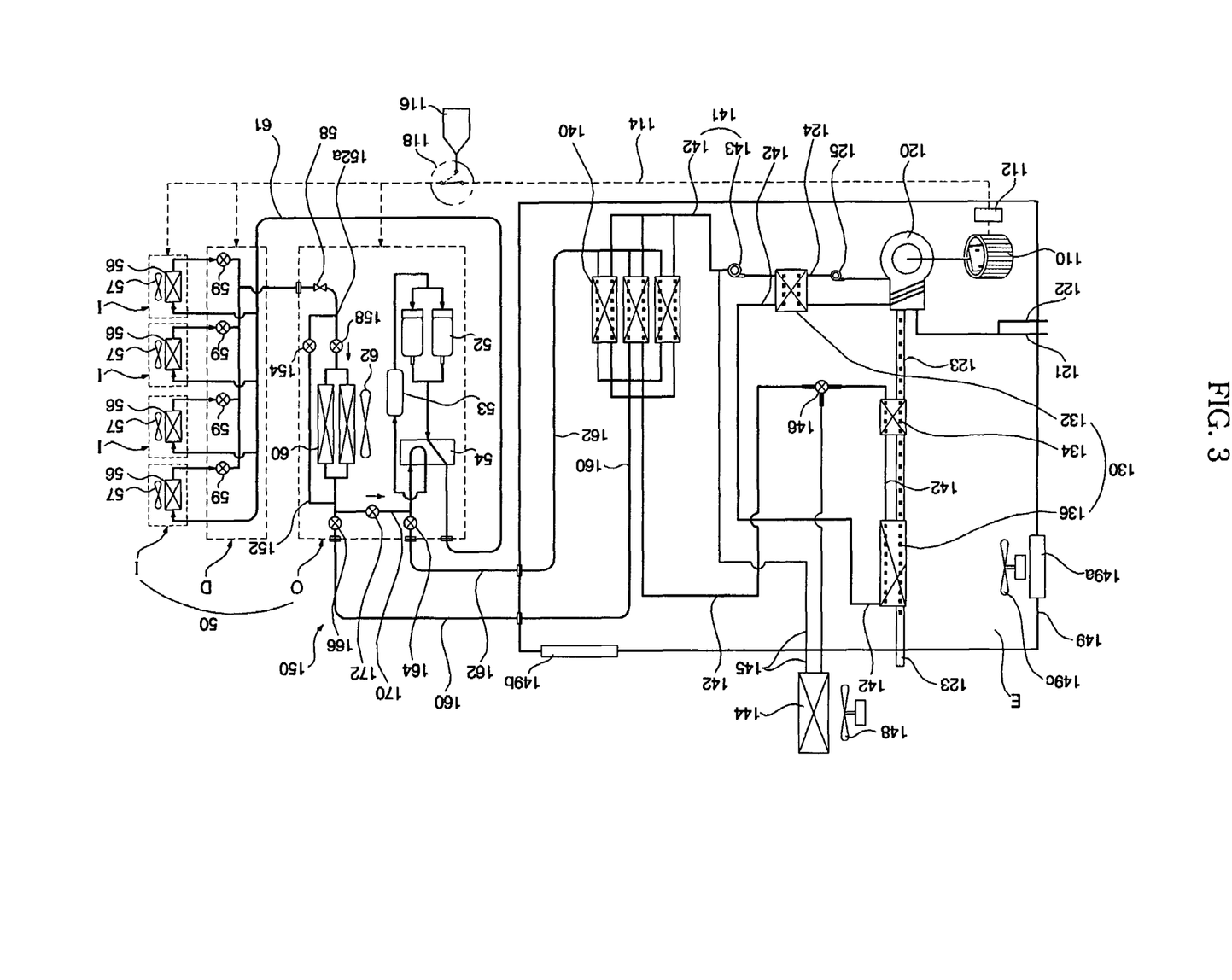
FIG. 3 is a schematic diagram of the cogeneration system, to which the control method according to the exemplary of the present invention is applied, illustrating a state in which the cogeneration system operates in a general heating mode.
Figure 4:
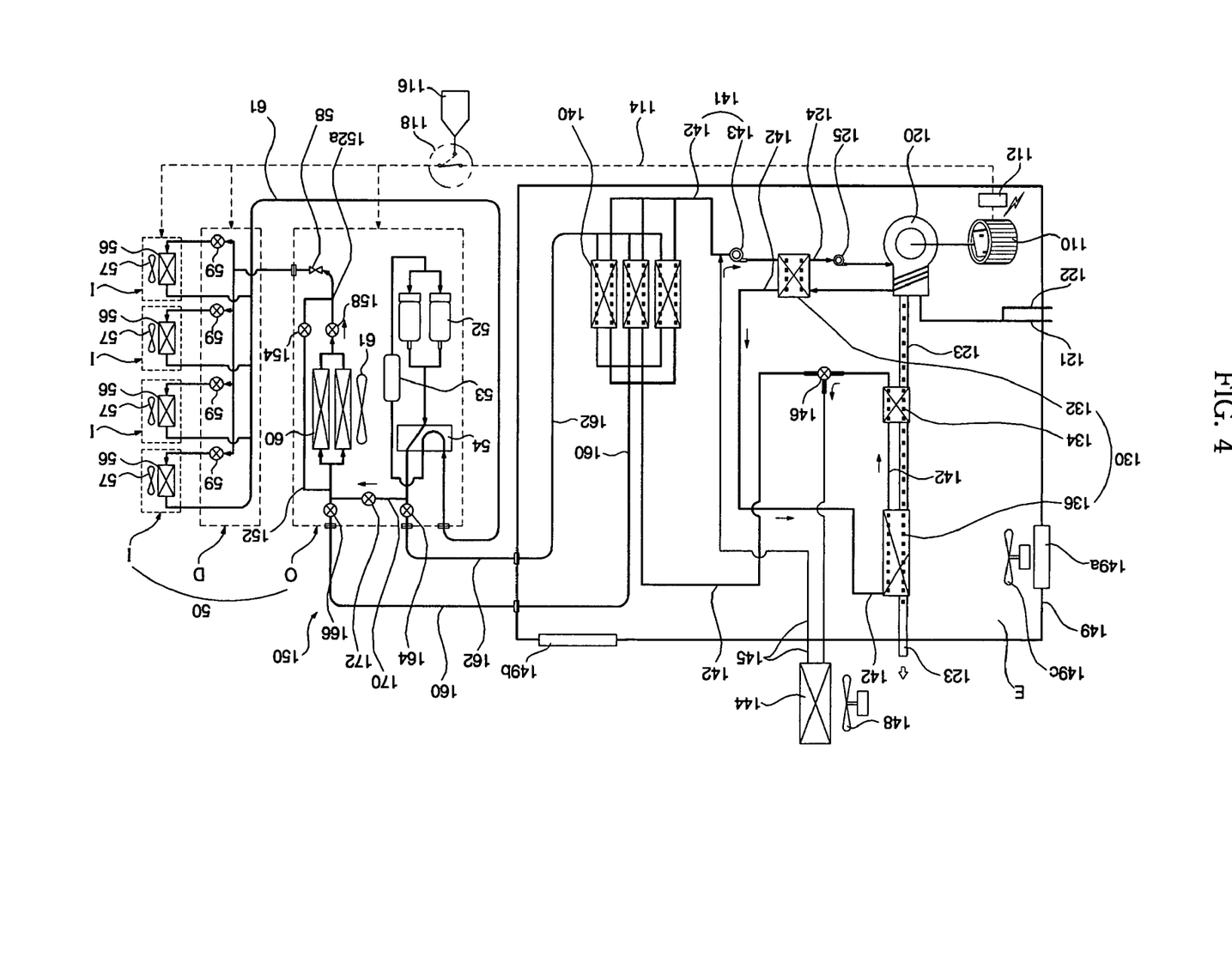
FIG. 4 is a schematic diagram of the cogeneration system, to which the control method according to the exemplary of the present invention is applied, illustrating a state in which the cogeneration system operates in a cooling mode.

FIG. 2 is a schematic diagram of a cogeneration system, to which a control method according to an exemplary of the present invention is applied, illustrating a state in which the cogeneration system operates in a waste heat recovering and heating mode. FIG. 3 is a schematic diagram of the cogeneration system, to which the control method according to the exemplary of the present invention is applied, illustrating a state in which the cogeneration system operates in a general heating mode. FIG. 4 is a schematic diagram of the cogeneration system, to which the control method according to the exemplary of the present invention is applied, illustrating a state in which the cogeneration system operates in a cooling mode.

As shown in FIGS. 2 to 4, the cogeneration system according to this embodiment includes a heat pump type air conditioner 50, which includes compressors 52, a 4-way valve 54, indoor heat exchangers 56, an expansion device 58, expansion devices 59, and outdoor heat exchangers 60, a generator 110 to generate electric power, a drive source 120, which operates to drive the generator 110, and generates waste heat during the operation thereof, a waste heat recoverer 130 to recover waste heat generated from the drive source 120, and a waste heat supplying heat exchanger 140, which can be heated by the waste heat recoverer 130.

An accumulator 53 is arranged at a suction conduit, to which the compressors 52 are connected to suck a refrigerant from the suction conduit. The accumulator 53 accumulates a liquid portion of the refrigerant passing through the suction conduit.

The compressors 52, 4-way valve 54, and outdoor heat exchangers 60 constitute an outdoor unit 0 of the heat pump type air conditioner 50.

An outdoor fan 62 is arranged in the outdoor unit 0 to blow outdoor air to the outdoor heat exchangers 60.

The 4-way valve 54 controls an inner refrigerant path established in the heat pump type air conditioner 50 to guide the refrigerant compressed by the compressors 52 to the indoor heat exchangers 56 during the heating operation of the heat pump type air conditioner 50, as shown in FIGS. 2 and 3, and to guide the refrigerant compressed by the compressors 52 to the outdoor heat exchangers 60, as shown in FIG. 4.

The indoor heat exchangers 56 constitute indoor units I of the cogeneration system, respectively. An indoor fan 57 is arranged in each indoor unit I to blow indoor air to an associated one of the indoor heat exchangers 56.

Each of the expansion devices 58 and 59 comprises a linear expansion valve (LEV). The expansion device 58 is a common expansion device, which is arranged in the outdoor unit 0, whereas the expansion devices 59 are individual expansion devices, which constitute a distributor D.

Although the heat pump type air conditioner 50 includes a plurality of indoor heat exchangers 56, and thus, a plurality of indoor units I, and a plurality of individual expansion devices 59, a single heat exchanger 56, and thus, a single indoor unit I, and a single expansion device 59 may be used. The following description will be described only in conjunction with the case in which a plurality of indoor heat exchangers 56, and thus, a plurality of indoor units I, and a plurality of individual expansion devices 59 are used.

The generator 110 may be an AC generator or a DC generator. The generator 110 includes a rotor coupled to an output shaft of the drive source 120 so that the generator 110 generates electric power during rotation of the output shaft.

An inverter 112 is coupled to the generator 110 to convert the generated electric power between DC and AC.

The inverter 112 is coupled with the heat pump type air conditioner 50 via a power line 114, so as to supply the generated electric power to the heat pump type air conditioner 50 via the power line 114.

In the cogeneration system, commercial electric power supplied from a commercial power source 116 or the electric power generated from the generator 110 is selectively supplied to the heat pump type air conditioner 50. To this end, a power change switch 118 is arranged at the power line 114.

When the power change switch 118 is switched to a commercial power supply mode, the power change switch 118 connects a power supply line of the commercial power source 116 and a power application line of the heat pump type air conditioner 50. In this case, accordingly, electric power supplied from the commercial power source 116 is applied to the heat pump type air conditioner 50.

On the other hand, when the power change switch 118 is switched to a generator's power supply mode, the power change switch 118 connects a power supply line of the generator 110 and the power application line of the heat pump type air conditioner 50. In this case, accordingly, electric power supplied from the generator 110 is applied to the heat pump type air conditioner 50.

The drive source 120 comprises a fuel cell or an engine, which operates using fuel such as liquefied gas or liquefied petroleum gas. The following description will be given only in conjunction with the case in which the drive source 120 comprises an engine.

A fuel supply tube 121, an air supply tube 122, and an exhaust tube 123 are connected to the drive source 120. The fuel supply tube 121 is adapted to supply fuel such as liquefied gas or liquefied petroleum gas to the drive source 120. The air supply tube 122 is joined to the fuel supply tube 121 to supply air to the drive source 120. The exhaust tube 123 is adapted to discharge exhaust gas generated from the drive source 120.

The waste heat recoverer 130 includes a cooling water heat exchanger 132 connected to the drive source 120 via a cooling water line 124 to recover heat of cooling water used to cool the drive source 120, a first exhaust gas heat exchanger 134 arranged at the exhaust tube 123 to recover heat of exhaust gas discharged from the drive source 120, and a second exhaust gas heat exchanger 136 arranged at the exhaust tube 123 to recover the residual heat of the exhaust gas that has released waste heat to the first exhaust gas heat exchanger 134.

A cooling water circulation pump 125 is arranged at the drive source 120 or cooling water line 124 to cause the cooling water to be circulated through the drive source 120 and cooling water heat exchanger 132.

Heat of the cooling water heat exchanger 132, first exhaust gas heat exchanger 134, and second exhaust gas heat exchanger 136 is transferred to the waste heat supplying heat exchanger 140 via a heat transfer unit 141.

The heat transfer unit 141 includes a heat medium circulation conduit 142 to guide the heat medium to be circulated through the cooling water heat exchanger 132, second exhaust gas heat exchanger 136, first exhaust gas heat exchanger 134, and waste heat supplying heat exchanger 140, and a heat medium circulation pump 143 arranged at the heat medium circulation conduit 142 arranged at the heat medium circulation conduit 142 to pump the heat medium.

Meanwhile, the cogeneration system further includes a radiating heat exchanger 144 adapted to radiate the heat recovered by the waste heat recoverer 130.

The radiating heat exchanger 144 is connected to the heat medium circulation conduit 142 via a radiating bypass conduit 145, so that the heat medium passing through the heat medium circulation conduit 142 bypasses the waste heat supplying heat exchanger 140, and is circulated through the radiating heat exchanger 144.

The cogeneration system further includes a flow rate control valve 146 adapted to selectively distribute the waste heat recovered by the waste heat recoverer 130 to the waste heat supplying heat exchanger 140 or radiating heat exchanger 144.

A radiating fan 148 is arranged near the radiating heat exchanger 144 to blow outdoor air to the radiating heat exchanger 144.

The cogeneration system further includes a chassis 149, in which an engine room E is defined to receive the generator 110, drive source 120, waste heat recoverer 130, and waste heat supplying heat exchangers 140.

An air inlet 149a and an air outlet 149b are formed at the chassis 149 for ventilation of the engine room E. A ventilation fan 149c is also mounted to the chassis 149 to suck outdoor air into the engine room E through the air inlet 149a, and to outwardly discharge the air from the engine room E through the air outlet 149c after forcing the air to pass through the engine room E.

The cogeneration system further includes an outdoor heat exchanger bypass conduit 152 to guide the refrigerant emerging from the expansion devices 58 and 59 in an expanded state during the waste heat recovering and heating operation of the heat pump type air conditioner 50 to bypass the outdoor heat exchangers 60. The cogeneration system also includes waste heat supplying heat exchanger connecting conduits 160 and 162 to guide the refrigerant bypassed through the outdoor heat exchanger bypass conduit 152 during the waste heat recovering and heating operation of the heat pump type air conditioner 50 to enter the 4-way valve 54 after passing through the waste heat supplying heat exchanger 140. The cogeneration system further includes a waste heat supplying heat exchanger bypass conduit 170 to guide the refrigerant emerging from the 4-way valve 54 during the cooling operation of the heat pump type air conditioner 50 to bypass the waste heat supplying heat exchanger 140.

The cogeneration system further includes a first bypass valve 154 arranged at the outdoor heat exchanger bypass conduit 152, a second bypass valve 164 arranged at the waste heat supplying heat exchanger connecting conduit 162, and a third bypass valve 166 arranged at the waste heat supplying heat exchanger connecting conduit 160. The cogeneration system also includes a first cooling operation control valve 158 arranged between a branching point or inlet 152a of the outdoor heat exchanger bypass conduit 152 and the outdoor heat exchangers 60, and a second cooling operation control valve 172 arranged at the waste heat supplying heat exchanger bypass conduit 170.

Figure 5:
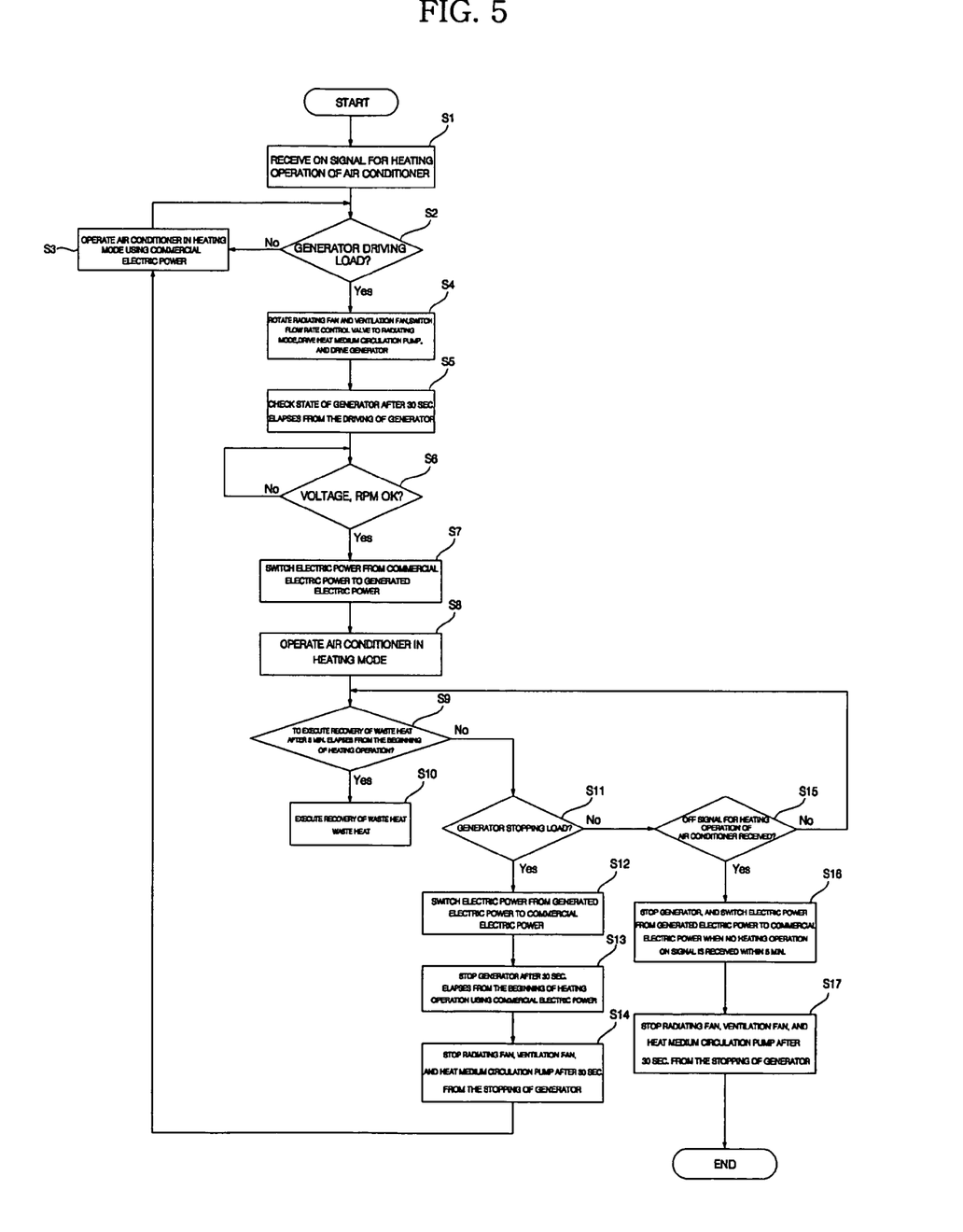
FIG. 5 is a flow chart of the heating operation of the cogeneration system controlled by the control method according to the exemplary of the present invention.

FIG. 5 is a flow chart of the heating operation of the cogeneration system controlled by the control method according to the exemplary of the present invention.

First, in response to reception of a heating operation ON signal for the heat pump type air conditioner 50 (S1), the cogeneration system determines the operation load or power load of the heat pump type air conditioner 50 (S2).

The power load may be determined based on the number of indoor units I to be operated, or based on the amount of electric power required to drive the compressors 52. Various methods other than these methods may also be used. For example, the power load may be determined based on the amount of electric power applied from the commercial power source 116 to the heat pump type air conditioner 50. The following description will be given in conjunction with the case in which the power load is determined based on the number of indoor units I to be operated.

When the number of indoor units I to be operated is 3 or more, the power load is determined to correspond to a load requiring driving of the generator 110 (hereinafter, referred to as a "generator driving load"). On the other hand, when the number of indoor units I to be operated is 2 or less, it is determined that the power load does not correspond to the generator driving load (S2).

When it is determined that the power load does not correspond to the generator driving load, the cogeneration system controls the power change switch 118 to be switched to the commercial power supply mode, and controls the heat pump type air conditioner 50 to operate in the general heating mode using the commercial electric power, as shown in FIG. 3 (S3).

That is, the 4-way valve 54 is switched to a heating mode. The compressors 52 are driven, and the outdoor fan 62 is rotated. Also, the first, second and third bypass valves 154, 164, and 166 are closed, whereas the first and second cooling operation control valves 158 and 172 are opened.

The refrigerant, which is compressed in the compressors 52, passes through the 4-way valve 54, indoor heat exchangers 56, expansion devices 58 and 59, outdoor heat exchangers 60, 4-way valve 54, and accumulator 53, in this order, and then returns to the compressors 52. In this case, each outdoor heat exchanger 60 functions as an evaporator, and each indoor heat exchanger 56 functions as a condenser, thereby heating indoor air.

On the other hand, when it is determined that the power load corresponds to the generator driving load, the cogeneration system controls the power change switch 118 to be switched to the generator's power supply mode. In this case, accordingly, the electric power generated from the generator 110 is supplied to the heat pump type air conditioner 50.

Subsequently, the radiating fan 148 and ventilation fan 149c are rotated. The flow rate control valve 146 is also switched to a radiating mode. Also, the heat medium circulation pump 143 and drive source 120 are driven (S4).

During the operation of the drive source 120, the rotor of the generator 110 is rotated, thereby generating electric power. The generated electric power is supplied to the heat pump type air conditioner 50 via the power line 114, as shown in FIG. 2.

During the operation of the drive source 120, waste heat of the exhaust gas of the drive source 120 and waste heat of the cooling water of the drive source 120 are recovered by the first and second exhaust gas heat exchangers 134 and 136, and the cooling water heat exchanger 132, respectively.

When the flow rate control valve 146 is switched to the radiating mode under the condition in which the heat medium circulation pump 143 is driven, the heat medium in the heat medium circulation conduit 142 is circulated through the cooling water heat exchanger 132, first exhaust gas heat exchanger 134, second exhaust gas heat exchanger 136, and radiating heat exchanger 144, as shown in FIG. 2. During this circulation, the heat medium transfers, to the radiating heat exchanger 144, the heat of the cooling water heat exchanger 132, first exhaust gas heat exchanger 134, and second exhaust gas heat exchanger 136. The heat transferred to the radiating heat exchanger 144 is discharged to the atmosphere by the outdoor air blown in accordance with the rotation of the radiating fan 148.

Meanwhile, when a predetermined time (for example, 30 seconds) elapses after the drive source 120 begins to operate, the cogeneration system checks the electric power generation state of the generator 110 (S5).

The checking of the electric power generation state of the generator 110 is executed in such a manner that: it is determined that the electric power generation state of the generator 110 is normal when the voltage of the generator 110 is within a predetermined voltage range, and the RPM of the generator 110 is within a predetermined RPM range, whereas it is determined that the electric power generation state of the generator 110 is abnormal when the voltage of the generator 110 is beyond the predetermined voltage range, or the RPM of the generator 110 is beyond the predetermined RPM range (S6).

When the electric power generation state of the generator 110 is normal, the electric power supplied to the heat pump type air conditioner 50 is switched from the commercial electric power to the generated electric power (S7).

Thus, the cogeneration system controls the heat pump type air conditioner 50 to operate in the general heating mode using the generated electric power, as shown in FIG. 3 (S8).

That is, for the heating operation of the heat pump type air conditioner 50, the 4-way valve 54 is switched to the heating mode. The compressors 52 and outdoor fan 62 are driven, using the generated electric power. Also, the first, second and third bypass valves 154, 164, and 166 are closed, whereas the first and second cooling operation control valves 158 and 172 are opened.

The refrigerant, which is compressed in the compressors 52, passes through the 4-way valve 54, indoor heat exchangers 56, expansion devices 58 and 59, outdoor heat exchangers 60, 4-way valve 54, and accumulator 53, in this order, and then returns to the compressors 52. In this case, each outdoor heat exchanger 60 functions as an evaporator, and each indoor heat exchanger 56 functions as a condenser, thereby heating indoor air.

When a predetermined time (for example, 5 minutes) elapses after the general heating operation begins, the cogeneration system determines whether or not it is necessary to recover the waste heat of the drive source 120 (S9).

The determination of whether or not it is necessary to recover the waste heat of the drive source 120 may be achieved, taking into consideration a required capacity of the indoor units I, outdoor temperature, a target heating temperature, indoor temperature, etc. The following description will be given in conjunction with the case in which whether or not it is necessary to recover the waste heat of the drive source 120 is determined based on the outdoor temperature and the required capacity of the indoor units I.

When the outdoor temperature is not higher than a predetermined temperature (for example, 15° C.), and the required capacity of the indoor units I is not smaller than a predetermined capacity (for example, 20% of the total capacity of the indoor units I), the cogeneration system determines that it is necessary to recover waste heat (S10). On the other hand, when the outdoor temperature is higher than the predetermined temperature (for example, 15° C.), or the required capacity of the indoor units I is smaller than the predetermined capacity (for example, 20% of the total indoor unit capacity), the cogeneration system determines that it is unnecessary to recover waste heat (S11).

When it is determined that it is unnecessary to recover waste heat, the cogeneration system also determines whether or not the operation load or power load of the heat pump type air conditioner 50 corresponds to a load not requiring driving of the generator 110 (hereinafter, referred to as a "generator stopping load") (S11).

The determination of whether or not the power load corresponds to the generator stopping load is achieved, based on the power load of the heat pump type air conditioner 50.

When it is determined that the generator driving load corresponds to the generator stopping load, the electric power supplied to the heat pump type air conditioner 50 is switched from the generated electric power to the commercial electric power (S12).

Thus, the cogeneration system controls the heat pump type air conditioner 50 to operate in the general heating mode using the commercial electric power, as shown in FIG. 3. When a predetermined time (for example, 30 seconds) elapses after the power switching to the commercial electric power, the drive source 120 is stopped to stop the generation of electric power (S13)

Also, when a predetermined time (for example, 30 seconds) elapses after the stopping of the drive source 120, the radiating fan 148 and ventilation fan 149c are stopped. The heat medium circulation pump 143 is also stopped (S14).

Subsequently, the cogeneration system controls the heat pump type air conditioner 50 to operate in the general heating mode using the commercial electric power, as shown in FIG. 3 (S3). The above-described procedures are then repeated, depending on a variation in the generator driving load (S2, S4, S5, S6, S7, S8, S9, S10, S11, S12, S13, S14, S3).

Meanwhile, when a heating operation OFF signal for the heat pump type air conditioner 50 is not input under the condition in which it is determined that it is unnecessary to recover waste heat (S9), and it is determined that the generator driving load does correspond to the generator stopping load (S11), the cogeneration system again determines whether or not it is necessary to recover waste heat, while controlling the heat pump type air conditioner 50 to operate continuously in the general heating mode using the generated electric power (S15).

On the other hand, when the heating operation OFF signal is input (S15), and the heating operation ON signal for the heat pump type air conditioner 50 is not input within a predetermined time (for example, 5 minutes) after the heating operation OFF signal was input, under the condition in which it is determined that it is unnecessary to recover waste heat (S9), and it is determined that the power load does not correspond to the generator stopping load (S11), the electric power supplied to the heat pump type air conditioner 50 is switched from the generated electric power to the commercial electric power, and the drive source 120 is stopped (S16).

Subsequently, when a predetermined time (for example, 30 seconds) elapses after the drive source 120 is stopped, the radiating fan 148 and ventilation fan 149c are stopped, and the heat medium circulation pump 143 is stopped (S17).

Thereafter, the cogeneration system waits for a new operation command.

Figure 6:
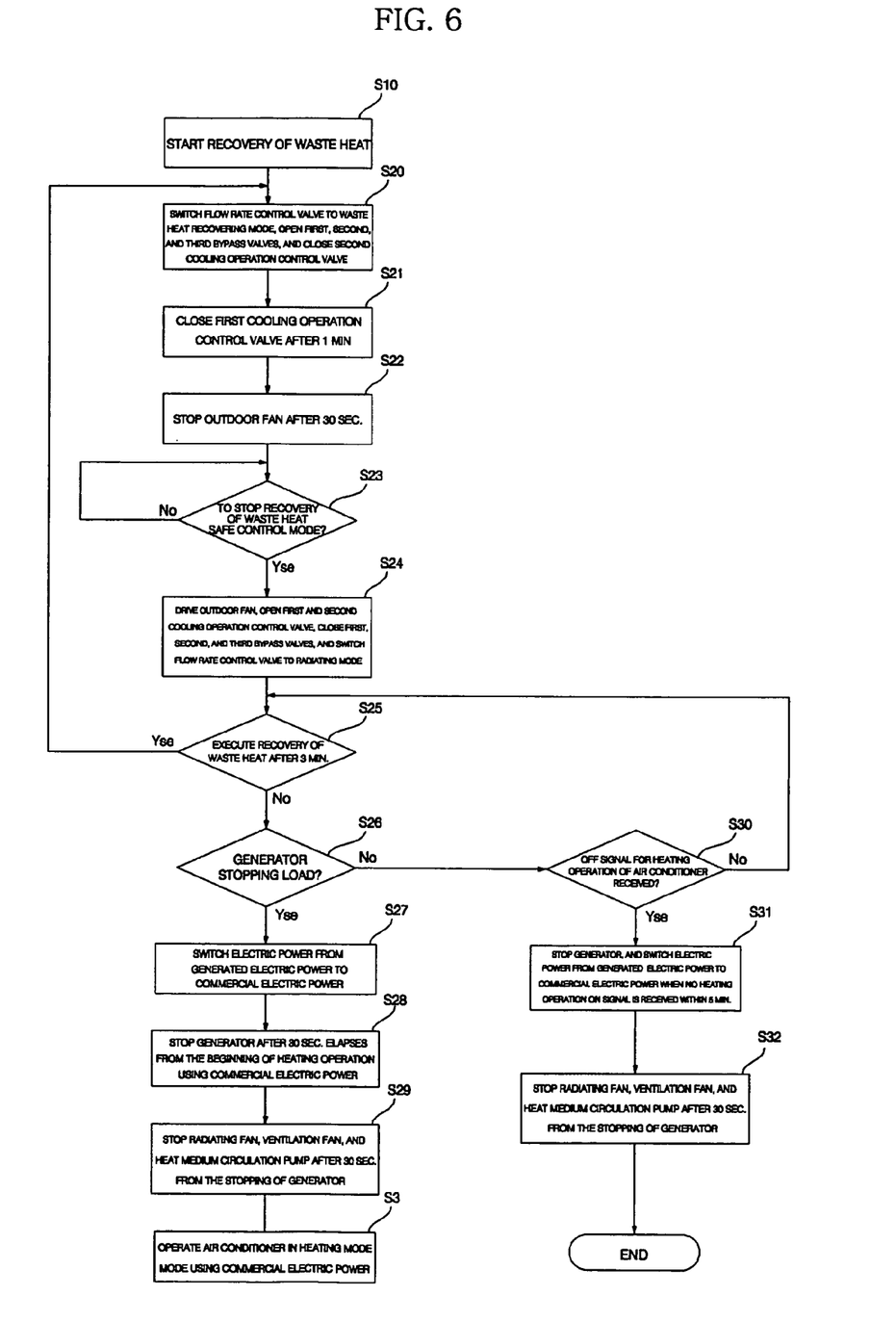
FIG. 6 is a flow chart illustrating the waste heat recovering procedure of FIG. 5.

FIG. 6 is a flow chart illustrating the waste heat recovering procedure of FIG. 5.

When it is determined that it is necessary to recover waste heat (S10), the cogeneration system controls the flow rate control valve 146 to be switched to the waste heat recovering mode, and controls the first, second, and third bypass valves 154, 164, and 166 to be opened, while controlling the second cooling operation control valve 172 to be closed, thereby causing the refrigerant in the heat pump type air conditioner 50 to enter the waste heat supplying heat exchanger 140 after bypassing the outdoor heat exchangers 60 (S20). Accordingly, the refrigerant is evaporated by the waste heat supplying heat exchanger 150.

In this case, the first cooling operation control valve 158 is opened to recover the refrigerant remaining in the outdoor heat exchangers 60.

When a predetermined time (for example, 1 minute) elapses after the closing of the second cooling operation control valve 712, the cogeneration system closes the first cooling operation control valve 158 (S21).

When a predetermined time (for example, 30 seconds) elapses after the closing of the first cooling operation control valve 158, the cogeneration system stops the outdoor fan 62 (S22).

Meanwhile, when the flow rate control valve 146 is switched to the waste heat recovering mode, the heat medium in the heat medium circulation conduit 142 is circulated through the cooling water heat exchanger 132, first exhaust gas heat exchanger 134, second exhaust gas heat exchanger 136, and waste heat supplying heat exchanger 140. As a result, the heat of the cooling water heat exchanger 132, first exhaust gas heat exchanger 134, and second exhaust gas heat exchanger 136 is transferred to the waste heat supplying heat exchanger 140 which is, in turn, heated by the waste heat of the drive source 120.

Also, under the condition in which the first, second, and third bypass valves 154, 164, and 166 are opened, and the first and second cooling operation control valves 158 and 172 are closed, the refrigerant, which has expanded while passing through the expansion devices 58 and 59, passes through the outdoor heat exchanger bypass conduit 152 while bypassing the outdoor heat exchangers 60, and then enters the waste heat supplying heat exchanger 140 via the waste heat supplying heat exchanger connecting conduit

160. As a result, the refrigerant is evaporated in the waste heat supplying heat exchanger 140.

The evaporated refrigerant is then fed to the 4-way valve 54 via the waste heat supplying heat exchanger connecting conduit 162, and is then circulated through the compressors 52. In this case, the cogeneration system can provide a constant heating capacity irrespective of a variation in outdoor temperature because the refrigerant expanded by the expansion devices 58 and 59 is evaporated in the waste heat supplying heat exchanger 140.

Meanwhile, the cogeneration system determines whether or not it is necessary to stop the recovery of waste heat, during the waste heat recovering and heating operation (S23).

Here, the determination of whether or not it is necessary to stop the recovery of waste heat is to determine whether or not a situation that it is necessary to stop the recovery of waste heat, as in a safe control mode, has occurred. For instance, if an abrupt variation such as an excessive variation in system pressure (for example, the suction pressure or discharge pressure of the compressors) occurs, the cogeneration system determines that it is necessary to stop the recovery of waste heat. If not, the cogeneration system determines that the recovery of waste heat must be continued.

When it is determined that the recovery of waste heat must be stopped, the cogeneration system controls the outdoor fan 62 to rotate, controls the first, second, and third bypass valves 154, 164, 166 to be closed, controls the first and second cooling operation control valves 158 and 172 to be opened, and controls the flow rate control valve 146 to be switched to the radiating mode, as shown in FIG. 3 (S24).

Under the condition in which the flow rate control valve 146 is switched to the radiating mode, the outdoor fan 62 rotates, the first, second, and third bypass valves 154, 164, 166 are closed, and the first and second cooling operation control valves 158 and 172 are opened, each outdoor heat exchanger 60 of the heat pump type air conditioner 50 functions as an evaporator.

When a predetermined time (for example, 3 minutes) elapses after the outdoor fan 62 begins to rotate, the cogeneration system re-determines whether or not it is necessary to recover waste heat (S25).

Here, the re-determination of whether or not it is necessary to recover waste heat is executed in such a manner that: it is determined that it is necessary to recover waste heat when the outdoor temperature is not higher than a predetermined temperature (for example, 15° C.), and the required indoor unit capacity is not smaller than a predetermined capacity (for example, 20% of the total indoor unit capacity), whereas it is determined it is unnecessary to recover waste heat when the outdoor temperature is higher than the predetermined temperature (for example, 15° C.), or the required indoor unit capacity is smaller than the predetermined capacity (for example, 20% of the total indoor unit capacity).

When it is determined that it is necessary to recover waste heat (S25), the cogeneration system repeats the above-described procedures (S20, S21, S22, S23, S24).

On the other hand, when it is determined that it is unnecessary to recover waste heat (S25), the cogeneration system again determines whether or not the power load corresponds to a generator stopping load (S26).

The determination of whether or not the power load corresponds to the generator stopping load is achieved, based on the power load of the heat pump type air conditioner 50.

When it is determined that the power load corresponds to the generator stopping load, the electric power supplied to the heat pump type air conditioner 50 is switched from the generated electric power to the commercial electric power (S27).

Thus, the cogeneration system controls the heat pump type air conditioner 50 to operate in the general heating mode using the commercial electric power. When a predetermined time (for example, 30 seconds) elapses after the power switching to the commercial electric power, the cogeneration system controls the drive source 120 to be stopped to stop the generation of electric power (S28).

Also, when a predetermined time (for example, 30 seconds) elapses after the stopping of the drive source 120, the cogeneration system controls the radiating fan 148 and ventilation fan 149c to be stopped, and controls the heat medium circulation pump 143 to be stopped (S29).

Subsequently, the cogeneration system controls the heat pump type air conditioner 50 to operate in the general heating mode using the commercial electric power, as shown in FIG. 3 (S3).

Meanwhile, when the heating operation OFF signal for the heat pump type air conditioner 50 is not input under the condition in which it is determined that it is unnecessary to recover waste heat (S25), and it is determined that the power load does correspond to the generator stopping load (S26), the cogeneration system again determines whether or not it is necessary to recover waste heat, while controlling the heat pump type air conditioner 50 to operate continuously in the general heating mode using the generated electric power (S30).

On the other hand, when the heating operation OFF signal is input (S30), and the heating operation ON signal for the heat pump type air conditioner 50 is not input within a predetermined time (for example, 5 minutes) after the heating operation OFF signal was input, under the condition in which it is determined that it is unnecessary to recover waste heat (S25), and it is determined that the power load does not correspond to the generator stopping load (S26), the electric power supplied to the heat pump type air conditioner 50 is switched from the generated electric power to the commercial electric power, and the drive source 120 is stopped (S31).

Subsequently, when a predetermined time (for example, 30 seconds) elapses after the drive source 120 is stopped, the cogeneration system controls the radiating fan 148 and ventilation fan 149c to be stopped, and controls the heat medium circulation pump 143 to be stopped (S32).

Thereafter, the cogeneration system waits for a new operation command.

Figure 7:
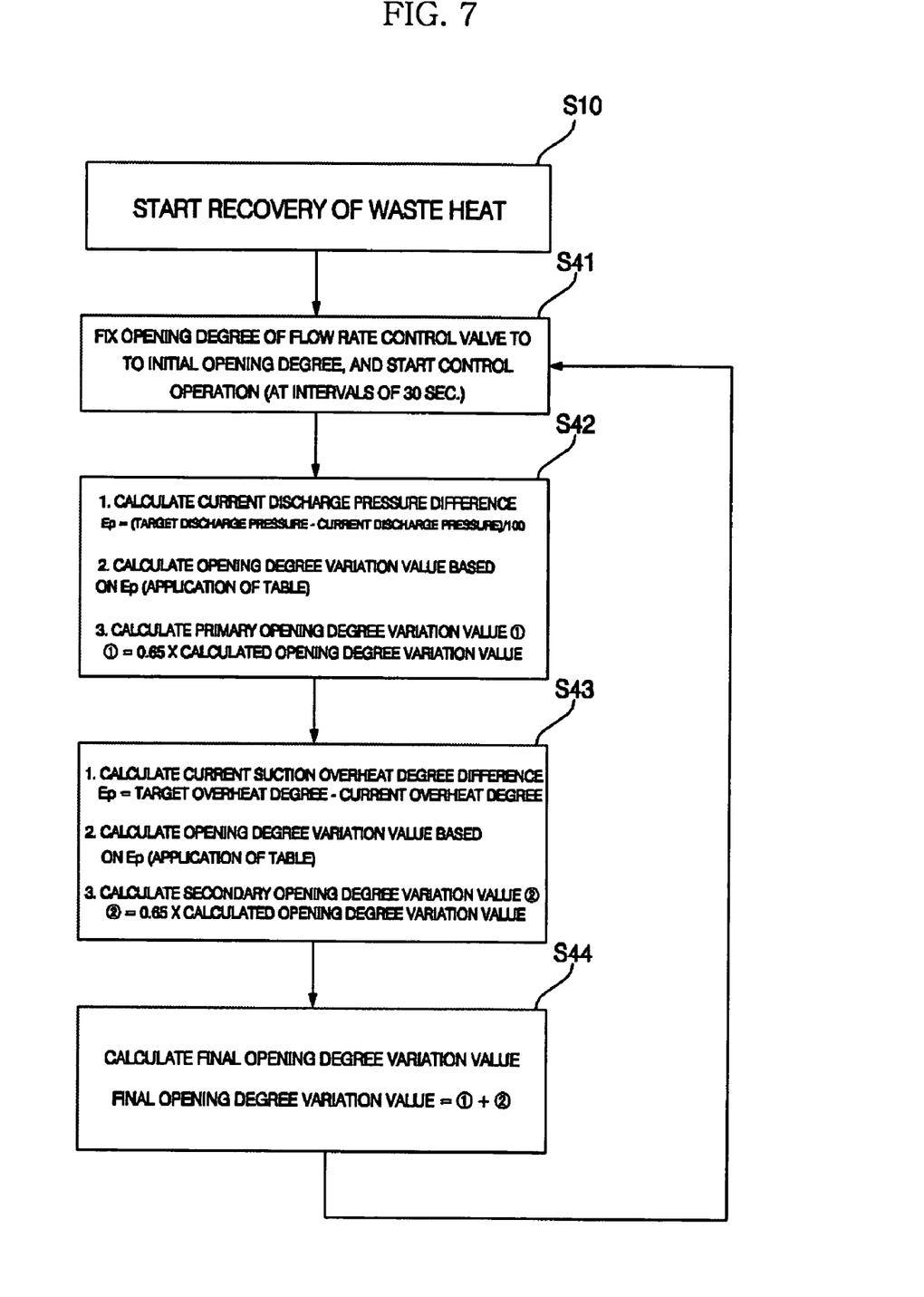
FIG. 7 is a flow chart illustrating the control procedure of FIG. 6 executed when the flow rate control valve operates in the waste heat recovering mode.

FIG. 7 is a flow chart illustrating the control procedures of FIGS. 2 to 4 executed when the flow rate control valve operates in the waste heat recovering mode.

When it is necessary to recover waste heat, the cogeneration system executes a flow rate control operation for the flow rate control valve 146, in which the cogeneration system fixes the opening degree of the flow rate control valve 146 to an initial opening degree when the flow rate control valve 146 is switched to the waste heat recovering mode under the control of the cogeneration system, and then changes the opening degree of the flow rate control valve 146 at intervals of a predetermined time (S41).

In the flow rate control operation, a primary opening degree variation value is calculated, based on the difference between the current discharge pressure of the compressors 52 in the heat pump type air conditioner 50 and a target discharge pressure (S42).

The primary opening degree variation value is calculated by deducting the current discharge pressure of the compressors 52 from the target discharge pressure, dividing a value obtained in the deduction by 100, thereby deriving a first Ep value, applying the first Ep value to a table, in which opening degree variation values respectively corresponding to various Ep values are stored, thereby deriving an opening degree variation value corresponding to the first Ep value, and multiplying the derived opening degree variation value by 0.65.

Thereafter, a secondary opening degree variation value is calculated, based on the current suction overheat degree difference of the compressors 52 in the heat pump type air conditioner from a target suction overheat degree (S43).

The secondary opening degree variation value is calculated by deducting the current overheat degree from a target overheat degree, thereby deriving a second Ep value, applying the second Ep value to the table, thereby deriving an opening degree variation value corresponding to the second Ep value, and multiplying the derived opening degree variation value by 0.65.

Finally, a final opening degree variation value is calculated by adding the secondary opening degree variation value to the primary opening degree variation value. Based on the final opening degree variation value, the cogeneration system changes the opening degree of the flow rate control valve 146 (S44).

Meanwhile, when the discharge temperature of the compressors 52 is not lower than a predetermined temperature (for example, 100° C.), the cogeneration system controls the flow rate control valve 146 to maintain the current opening degree irrespective of the final opening degree variation value.

Figure 8:
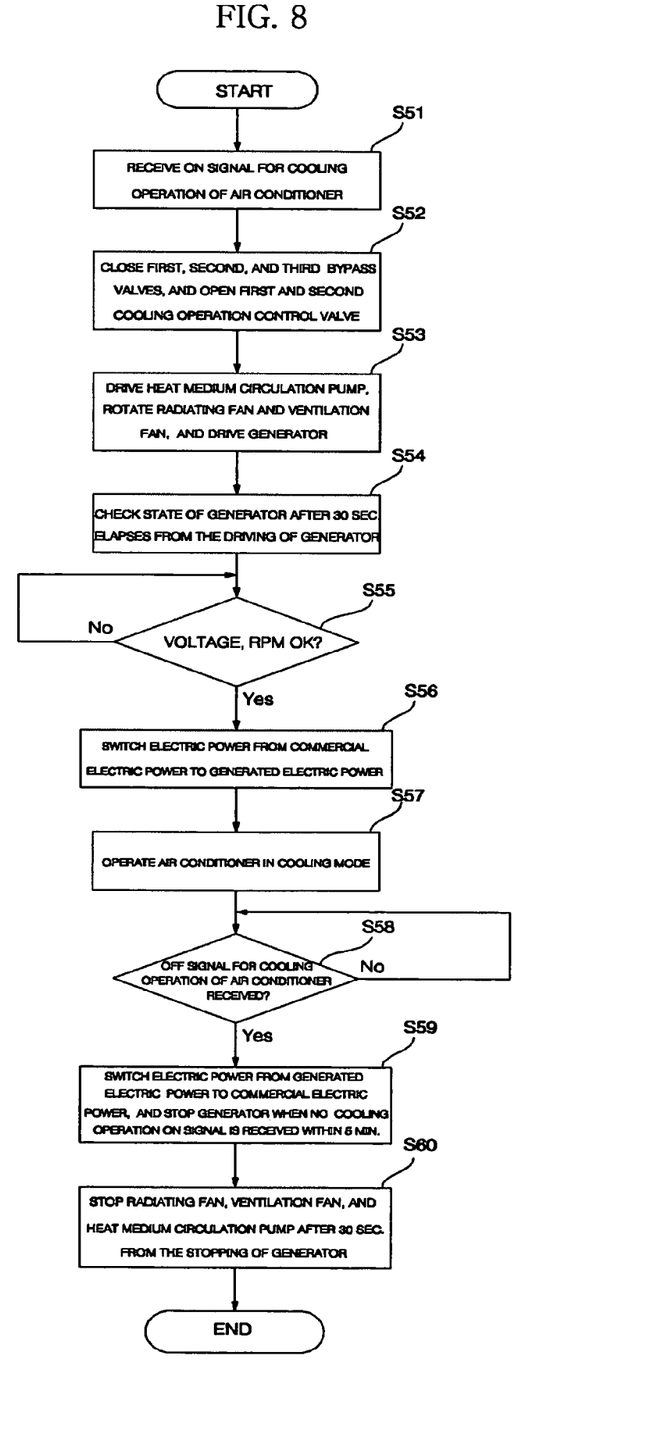
FIG. 8 is a flow chart illustrating the heating operation of the cogeneration system controlled by the control method according to the exemplary of the present invention.

FIG. 8 is a flow chart illustrating the heating operation of the cogeneration system controlled by the control method according to the exemplary of the present invention.

First, in response to reception of a cooling operation ON signal for the heat pump type air conditioner 50 (S51), the cogeneration system controls the heat pump type air conditioner 50 to switch the refrigerant path thereof such that the refrigerant is circulated through the compressors 52, 4-way valve 54, outdoor heat exchangers 60, expansion devices 58 and 59, indoor heat exchangers 56, 4-way valve 54, and compressors 52, in this order (S52). The flow rate control valve is also switched to the radiating mode.

That is, the 4-way valve 54 is switched to the cooling mode. The first, second, and third bypass valves 154, 164, and 166 are closed, and the first and second cooling operation control valves 158 and 170 are opened.

The cogeneration system then controls the heat medium circulation pump 143 to operate, controls the radiating fan 148 and ventilation fan 149c to rotate, and controls the drive source 120 to operate (S53).

During the operation of the drive source 120, waste heat of the exhaust gas of the drive source 120 and waste heat of the cooling water of the drive source 120 are recovered by the first and second exhaust gas heat exchangers 134 and 136, and the cooling water heat exchanger 132, respectively.

When the flow rate control valve 146 is switched to the radiating mode under the condition in which the heat medium circulation pump 143 is driven, the heat medium in the heat medium circulation conduit 142 is circulated through the cooling water heat exchanger 132, first exhaust gas heat exchanger 134, second exhaust gas heat exchanger 136, and radiating heat exchanger 144, as shown in FIG. 4. During this circulation, the heat medium transfers, to the radiating heat exchanger 144, the heat of the cooling water heat exchanger 132, first exhaust gas heat exchanger 134, and second exhaust gas heat exchanger 136. The heat transferred to the radiating heat exchanger 144 is discharged to the atmosphere by the outdoor air blown in accordance with the rotation of the radiating fan 148.

Meanwhile, when a predetermined time (for example, 30 seconds) elapses after the drive source 120 begins to operate, the cogeneration system checks the electric power generation state of the generator 110 (S54).

The checking of the electric power generation state of the generator 110 is executed in the same manner as in the heating operation of the heat pump type air conditioner 50, so that no detailed description thereof will be given.

When the electric power generation state of the generator 110 is normal (S55), the electric power supplied to the heat pump type air conditioner 50 is switched from the commercial electric power to the generated electric power (S56).

Thus, the cogeneration system controls the heat pump type air conditioner 50 to operate in the general heating mode using the generated electric power, as shown in FIG. 4 (S57).

That is, for the cooling operation of the heat pump type air conditioner 50, the compressors 52 are driven, using the generated electric power. The 4-way valve 54 is switched to the cooling mode. The refrigerant, which is compressed in the compressors 52, passes through the 4-way valve 54, outdoor heat exchangers 60, expansion devices 58 and 59, indoor heat exchangers 56, and 4-way valve 54, in this order, and then returns to the compressors 52. In this case, each outdoor heat exchanger 60 functions as a condenser, and each indoor heat exchanger 56 functions as an evaporator, thereby cooling indoor air.

When a cooling operation OFF signal for the heat pump type air conditioner 50 is input during the cooling operation using the generated electric power (S58), and a cooling operation ON signal is not input within a predetermined time (for example, 5 minutes) after the cooling operation OFF signal was input, the electric power supplied to the heat pump type air conditioner 50 is switched from the generated electric power to the commercial electric power. Also, the cogeneration system also controls the drive source 120 to be stopped to stop the generation of electric power (S59).

Also, when a predetermined time (for example, 30 seconds) elapses after the stopping of the drive source 120, the radiating fan 148 and ventilation fan 149c are stopped. The heat medium circulation pump 143 is also stopped (S60).

Meanwhile, although the control method of the present invention has been described in conjunction with the exemplary embodiment, the present invention is not limited thereto. For example, when the power load corresponds to the generator driving load, and the electric power generation state of the generator 110 is normal, it may be possible to execute the recovery of waste heat (S10) without the determination of whether or not it is necessary to execute the recovery of waste heat (S9).

The cogeneration system according to any one of the above-described embodiments of the present invention has various effects.

That is, first, the cogeneration system control method according to the present invention has advantages in terms of economy and safety because the control method determines whether or not the operation load or power load of the air conditioner corresponds to the generator driving load, controls the generator to operate when it is determined that the operation load of the air conditioner corresponds to the generator driving load, controls the air conditioner to operate using electric power generated from the generator when the generator operates normally, and controls the air conditioner to operate using commercial electric power when the operation load of the air conditioner is not the generator driving load or when the generator operates abnormally.

Second, the cogeneration system control method according to the present invention has an advantage in that it is possible to provide a constant heating capacity irrespective of outdoor temperature because the refrigerant of the air conditioner is evaporated using the waste heat generated from the drive source during an operation of the drive source to drive the generator when the air conditioner operates in the heating mode.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a cogeneration system, comprising:
   a first step of receiving an operation ON signal for an air conditioner;
   a second step of, following the first step, determining whether or not a power load of the air conditioner corresponds to a generator driving load requiring driving of a generator;
   a third step of, if it is determined at the second step that the power load corresponds to the generator driving load, rotating a radiating fan, switching a flow rate control valve to a radiating mode, driving a heat medium circulation pump, and driving a drive source adapted to drive the generator;
   a fourth step of, following the third step, checking an electric power generation state of the generator;
   a fifth step of, if it is determined at the fourth step that the generator operates normally, switching electric power supplied to the air conditioner from commercial electric power to electric power generated from the generator; and
   a sixth step of, following the fifth step, operating the air conditioner.

2. The method according to claim 1, further comprising:
   rotating a ventilation fan during the rotation of the radiating fan, and stopping the ventilation fan when the ventilation fan is stopped.

3. The method according to claim 1, wherein the checking of the electric power generation state of the generator at the fourth step is executed when a predetermined time elapses after the drive source begun to operate.

4. The method according to claim 1, wherein:
   when the air conditioner is a heat pump type air conditioner, and the operation ON signal is an ON signal for a heating operation of the heat pump type air conditioner,
   the sixth step comprises switching the flow rate control valve to a waste heat recovering mode to allow waste heat of the drive source to be recovered by a waste heat supplying heat exchanger, and stopping the radiating fan.

5. The method according to claim 1, wherein:
   when the air conditioner is a heat pump type air conditioner, and the operation ON signal is an ON signal for a heating operation of the heat pump type air conditioner,
   the sixth step comprises operating the heat pump type air conditioner in a heating mode, determining whether or not it is necessary to recover waste heat of the drive source by a waste heat supplying heat exchanger, following the operation of the heat pump type air conditioner, and switching the flow rate control valve to a waste heat recovering mode to allow the waste heat of the drive source to be recovered by the waste heat supplying heat exchanger when it is determined that it is necessary to recover the waste heat.

6. The method according to claim 5, wherein the sixth step further comprises:
   fixing an opening degree of the flow rate control valve to an initial opening degree when the flow rate control valve is switched to the waste heat recovering mode, and subsequently executing a flow rate control process at intervals of a predetermined time,
   wherein the flow rate control process for the flow rate control valve comprises:
   a primary opening degree variation value calculation procedure for calculating a primary opening degree variation value, based on a current discharge pressure difference of compressors included in the heat pump type air conditioner from a target discharge pressure;
   a secondary opening degree variation value calculation procedure for calculating a secondary opening degree variation value, based on a current suction overheat degree difference of the compressors in the heat pump type air conditioner from a target suction overheat degree; and
   an opening degree variation procedure for varying the opening degree of the flow rate control valve, based on a final opening degree variation value obtained by adding the secondary opening degree variation value to the primary opening degree variation value.

7. The method according to claim 5, wherein:
   when the cogeneration system comprises: an outdoor heat exchanger bypass conduit adapted to guide a refrigerant emerging from an expansion device included in the heat pump type air conditioner in an expanded state to bypass an outdoor heat exchanger included in the heat pump type air conditioner; waste heat supplying heat exchanger connecting conduits adapted to guide the refrigerant bypassed through the outdoor heat exchanger bypass conduit during the heating operation of the heat pump type air conditioner to enter a 4-way valve after passing through the waste heat supplying heat exchanger; a waste heat supplying heat exchanger bypass conduit to guide the refrigerant emerging from the 4-way valve during a cooling operation of the heat pump type air conditioner to bypass the waste heat supplying heat exchanger; a first bypass valve arranged at the outdoor heat exchanger bypass conduit; second and third bypass valves arranged at the waste heat supplying heat exchanger connecting conduits; a first cooling operation control valve arranged between an inlet of the outdoor heat exchanger bypass conduit and the outdoor heat exchanger, and a second cooling operation control valve arranged at the waste heat supplying heat exchanger bypass conduit,
   the sixth step comprises:
   a first procedure for opening the first, second and third bypass valves while closing the second cooling operation control valve to cause the refrigerant in the heat pump type air conditioner to be evaporated by the waste heat supplying heat exchanger after bypassing the outdoor heat exchanger;

a second procedure for closing the first cooling operation control valve when a predetermined time elapses after the second cooling operation control valve is closed; and a third procedure for stopping an outdoor fan when a predetermined time elapses after the first cooling operation control valve is closed.

8. The method according to claim 7, wherein the sixth step further comprises:

a fourth procedure for determining whether or not it is necessary to stop the recovery of waste heat, following the stopping of the outdoor fan; and a fifth procedure for, if it is determined in the fourth procedure that it is necessary to stop the recovery of waste heat, rotating the outdoor fan, closing the first, second, and third bypass valves, opening the first and second cooling operation control valves, and switching the flow rate control valve to the radiating mode.

9. The method according to claim 8, wherein the sixth step further comprises:

a sixth procedure for again determining whether or not it is necessary to execute the recovery of waste heat, when a predetermined time elapses after execution of the fifth step; and a seventh procedure for repeating the procedures, starting from the first procedure, when it is determined in the sixth procedure that it is necessary to execute the recovery of waste heat.

10. The method according to claim 5, further comprising:

a seventh step of, if it is determined at the sixth step that it is unnecessary to recover the waste heat, determining whether or not the power load of the heat pump type air conditioner corresponds to a generator stopping load not requiring the driving of the generator; and an eighth step of, if it is determined at the seventh step that the power load of the heat pump type air conditioner corresponds to the generator stopping load, switching the electric power supplied to the heat pump type air conditioner from the generated electric power to the commercial electric power, and operating the heat pump type air conditioner in the heating mode using the generated electric power.

11. The method according to claim 10, further comprising:

stopping the drive source when a predetermined time elapses after the switching of the electric power from the generated electric power to the commercial electric power at the eighth step.

12. The method according to claim 11, further comprising:

stopping the radiating fan and the heat medium circulation pump when a predetermined time elapses after the stopping of the drive source.

13. The method according to claim 12, further comprising:

repeating the steps, starting from the second step, after the stopping of the radiating fan and the heat medium circulation pump.

14. The method according to claim 10, further comprising:

switching the electric power supplied to the heat pump type air conditioner from the generated electric power to the commercial electric power, and stopping the drive source when it is determined at the seventh step that the power load of the heat pump type air conditioner does not correspond to the generator stopping load, a heating operating OFF signal for the heat pump type air conditioner is inputted, and an operation ON signal is not inputted within a predetermined time after the heating operation OFF signal was input.

15. The method according to claim 14, further comprising:

stopping the radiating fan and the heat medium circulation pump when a predetermined time elapses after the stopping of the drive source.

16. A method for controlling a cogeneration system, comprising:

a first step of receiving a cooling operation ON signal for an air conditioner;

a second step of, following the first step, switching a refrigerant path established in the air conditioner to allow a refrigerant in the air conditioner to be circulated through a compressor, an outdoor heat exchanger, an expansion device, and an indoor heat exchanger, and switching a flow rate control valve to a radiating mode;

a third step of driving a heat medium circulation pump, rotating a radiating fan, and driving a drive source adapted to drive the generator;

a fourth step of, following the third step, checking an electric power generation state of the generator;

a fifth step of, if it is determined at the fourth step that the generator operates normally, switching electric power supplied to the air conditioner from commercial electric power to electric power generated from the generator; and a sixth step of, following the fifth step, operating the air conditioner in a cooling mode.

17. The method according to claim 16, further comprising:

rotating a ventilation fan during the rotation of the radiating fan, and stopping the ventilation fan when the ventilation fan is stopped.

18. The method according to claim 17, wherein:

when the cogeneration system comprises: an outdoor heat exchanger bypass conduit adapted to guide a refrigerant emerging from expansion devices, included in the air conditioner in an expanded state to bypass an outdoor heat exchanger included in the air conditioner; waste heat supplying heat exchanger connecting conduits adapted to guide the refrigerant bypassed through the outdoor heat exchanger bypass conduit during the heating operation of the air conditioner to enter a 4-way valve after passing through the waste heat supplying heat exchanger; a waste heat supplying heat exchanger bypass conduit to guide the refrigerant emerging from the 4-way valve during a cooling operation of the air conditioner to bypass the waste heat supplying heat exchanger; a first bypass valve arranged at the outdoor heat exchanger bypass conduit; second and third bypass valves arranged at the waste heat supplying heat exchanger connecting conduits; a first cooling operation control valve arranged between an inlet of the outdoor heat exchanger bypass conduit and the outdoor heat exchanger, and a second cooling operation control valve arranged at the waste heat supplying heat exchanger bypass conduit, the second step comprises:

closing the first, second and third bypass valves while opening the first and second cooling operation control valves.

19. The method according to claim 17, further comprising:

switching the electric power supplied to the air conditioner from the generated electric power to the commercial electric power, and stopping the drive source when a cooing operating OFF signal for the air conditioner is inputted during execution of the sixth step, and a cooling operation ON signal is not inputted within a predetermined time after the cooling operation OFF signal was input.

20. The method according to claim 19, further comprising:

stopping the radiating fan and the heat medium circulation pump when a predetermined time elapses after the stopping of the drive source.

* * * * *